United States Patent [19]

Cherdron et al.

[11] Patent Number: 4,966,955

[45] Date of Patent: Oct. 30, 1990

[54] AROMATIC COPOLYETHER AMIDE WHICH CAN BE PROCESSED AS A THERMOPLASTIC, PROCESS FOR ITS PREPARATION, AND ITS USE FOR THE PRODUCTION OF MOLDING

[75] Inventors: Harald Cherdron, Wiesbaden; Hellmuth Deckers, Ingelheim; Friedrich Herold, Hofheim am Taunus; Reiner Hess, Wiesbaden, all of Fed. Rep. of Germany

[73] Assignee: Hoechst Aktiengesellschaft, Frankfurt am Main, Fed. Rep. of Germany

[21] Appl. No.: 357,527

[22] Filed: May 26, 1989

[30] Foreign Application Priority Data

May 28, 1988 [DE] Fed. Rep. of Germany ....... 3818208

[51] Int. Cl.$^5$ ...................... C08G 63/00; C08G 75/00
[52] U.S. Cl. .................... 528/183; 528/172; 528/173; 528/185
[58] Field of Search ............... 528/172, 173, 185, 183

[56] References Cited

U.S. PATENT DOCUMENTS 4,721,772 1/1988 Ueno et al. ........................... 528/336
4,847,354 7/1989 Keil et al. ............................ 528/340

Primary Examiner—Harold D. Anderson
Assistant Examiner—T. Mosley

[57] ABSTRACT

The structure of the aromatic copolyether amide which can be processed as a thermoplastic comprises recurring units of the formulae —CO—Ar$^1$—CO— (A), —NH—Ar$^1$—O—Ar$^1$—X—Ar$^1$—O—Ar$^1$—NH (B) and —NH—Ar$^2$—NH— (C) in which Ar$^1$ denotes a divalent, unsubstituted or substituted aromatic radical having 6 carbon atoms which is linked in the p-position, X represents a 2,2-propylidene link and Ar$^2$ is identical with Ar$^1$ or is Ar$^1$ which is linked in the m-position, or is the —Ar$^1$—Z—Ar$^1$— group in which Z is a direct bond or is a radical —CH$_2$—, —C(CH$_3$)$_2$—, —SO$_2$—, —CO—, —O—, —CH=CH—, —CO—NH— or —O—Ar$^1$—O— or the radical

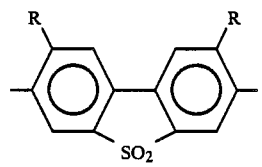

in which R represents hydrogen or a branched or unbranched alkyl radical having 1–4 carbon atoms. The proportion of units (A) and of the sum of units (B) and (C) is each 100 mol-%, the proportion of units (C) being up to 50 mol-% and, if Z represents —SO$_2$—, up to 75 mol-%. The Staudinger index [η] of the copolyether amide is in the range from 50 to 1000 cm$^3$/g, and the value of the glass transition temperature is above 200° C. The copolyether amide is prepared by a low-temperature solution, solid, interface or melt condensation process. The moldings produced therefrom in the form of filaments, wires, films and other moldings are obtained by processing the pulverulent copolyether amides or their solutions.

20 Claims, No Drawings

AROMATIC COPOLYETHER AMIDE WHICH CAN BE PROCESSED AS A THERMOPLASTIC, PROCESS FOR ITS PREPARATION, AND ITS USE FOR THE PRODUCTION OF MOLDING

The invention relates to aromatic copolyether amides which can be processed as thermoplastics, to their preparation by low-temperature solution, interface or melt condensation, articles molded therefrom, such as moldings, films, wires and filaments, and possible applications. The polymers according to the invention have excellent properties and can be prepared from readily accessible monomers and processed or molded as thermoplastics without difficulties. Regarding the properties, the good mechanical properties in particular, specifically the high initial modulus and a high glass transition temperature, and thus excellent thermostability, are regarded as advantageous.

Aromatic polyamides are known for their excellent thermal, chemical and mechanical properties.

Although predominantly p-linked homopolymers, such as poly-p-phenylene terephthalamide (PPTA) made from p-phenylenediamine (PPD) and terephthaloyl dichloride (TPC) have very good mechanical properties, they decompose, however, before their melting point, and, due to their low solubility in organic solvents, must be processed from concentrated sulfuric acid (two-step process, corrosion problems) (German Offenlegungsschrift 2,219,703). The cause is the very rigid chain structure of these polymers.

A remedy is provided firstly by copolymers based on PPTA, but, although processing in organic solvents is achieved, inter alia through the introduction of flexible groups, the polymers, like PPTA, still decompose, however, below the melting point. Examples of comonomers used here are 3,4'-diaminodiphenyl ether (3,4'-ODA) and 1,4-bis-(4'-aminophenoxy)benzene (BAPOB) (EP-B 0,045,934 and EP-A 0,199,090 respectively). Although attempts to press-mold such copolyamides, for example for polymers containing 3,4'-ODA, give moldings, they do not, however, permit the use of customary methods for thermoplastic processing or subsequent molding (JP 61/264 022-A).

Although conversion to systems comprising m-phenylenediamine (MPD) and isophthaloyl dichloride (IPC) results in polymers having further increased solubility, the decomposition is, however, still below the melting point here (U.S. Pat. No. 3,063,966). Press-molding of these aromatic polyamides gives moldings having the same disadvantages as above and, in addition, the mechanical properties are at a relatively low level (EP-A 0,198,167 and EP-A 0,200,472).

Only the introduction of flexible components results in meltable polyaramides. The problem here is the narrow latitude between processability as thermoplastics, i.e. an adequate difference between the processing temperature necessary and the decomposition temperature, and mechanical properties which are still good, since high values for the initial modulus are based on the stiffest possible polymer structure, i.e. p-linking where possible. In addition, the thermal stability required provides a restriction to the use of predominantly aromatic components, since incorporation of aliphatic groups results in lower thermal stability (U.S. Pat. No. 4,072,665 and U.S. Pat. No. 4,087,481).

A predominantly aromatic, relatively flexible and easily accessible monomer which is often employed for the preparation of aromatic polyether amides is 2,2-bis-(4'-aminophenoxyphenyl)propane BAP, which is preferably synthesized from the products bisphenol A and p-chloronitrobenzene, which are available on a large industrial scale.

Meltable polyether amides based on IPC and BAP are also known (U.S. Pat. No. 3,505,288, Examples 3 and 4). The high proportion of m-structures and correspondingly relatively poor mechanical properties, in particular the initial modulus, appears disadvantageous. Polymers made from TPC and BAP (Example 5) are described as being not meltable and having a decomposition point of 350° C.

An improvement with respect to the meltability and the mechanical properties of polyether amides is achieved by means of polymers made from a combination of an aromatic diamine containing ether groups and an aromatic diamine containing an aromatic dicarboxylic acid dihalide (DE-A 2,636,379). specific example describes the use of BAP/MPD and IPC.

Polymers made from IPC and BAP/MPD mixtures have also been published (U.S. Pat. No. 4,410,684). Here, compositions in which the major part comprises MPD, i.e. more than 50 mol-%, are described. No information is given on TPC in this publication.

The concept of the two last-mentioned publications is based on the incorporation or use of m-structures which result in lower glass transition temperatures and initial moduli. Even here, however, it has not been indicated that the use of TPC gives copolyether amides having particularly valuable properties.

The invention has the object of developing aromatic copolyether amides which can be processed as thermoplastics and which have good mechanical properties. In particular, it concerns the initial modulus and a high glass transition temperature, i.e. excellent thermal stability should be made possible.

The invention relates to an aromatic copolyether amide which can be processed as a thermoplastic, wherein the structure comprises recurring units of the formulae

$$-CO-Ar^1-CO-, \quad (A)$$

$$-NH-Ar^1-O-Ar^1-X-AR^1-O-Ar^1-NH- \quad (B)$$

and

$$-NH-Ar^2-NH- \quad (C)$$

in which $Ar^1$ denotes a divalent, unsubstituted or substituted aromatic radical having 6 carbon atoms which is linked in the p-position, X represents a 2,2-propylidene link and $Ar^2$ is identical with $Ar^1$ or $Ar^1$ linked in the m-position, or is the $-A^1-Z-Ar^1-$ group in which Z is a direct bond or a radical $-CH_2-$, $-C(CH_3)_2-$, $-SO_2-$, $-CO-$, $-O-$, $-CH=CH-$, $-CO-NH-$ or $-O-Ar^1-O-$ or the radical

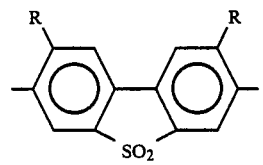

in which R represents hydrogen or a branched or unbranched alkyl radical having 1–4 carbon atoms, the proportion of units (A) and of the sum of units (B) and (C) is each 100 mol-%, the proportion of units (C) being up to 50 mol-% and, if Z represents —SO₂—, up to 75 mol-%, and the Staudinger index [η] of the copolyether amide is in the range from 50 to 1000 cm³/g and the glass transition temperature is above 200° C.

The proportion of C is preferably up to 25 mol-% and, if —Z— represents the —SC₂— group, is preferably up to 50 mol-%.

The copolymers can be prepared by customary condensation techniques, such as low-temperature solution, solid, interface or melt condensation.

Surprisingly, these aromatic copolyether amides can be processed well as thermoplastics, for example by press-molding to form moldings, extrusion or injection molding, and have unexpectedly good properties. The processing to form moldings, films and wires is of course preferably carried out by melt processes, but films, filaments and wires can also be obtained by solution processes.

The following compounds are suitable for the use of preparation of copolyether amides according to the invention:

Dicarboxylic acid derivatives of the formula

  (A')

in which —Ar¹— represents a divalent radical as described above, W, depending on the condensation technique chosen, denotes a halogen, preferably chlorine, or an —OH— or —OR— group where R denotes a branched or unbranched aliphatic radical having 1–4 carbon atoms in the alkyl group or an aromatic radical, for example terephthaloyl dichloride, 2-chloro-terephthaloyl dichloride, terephthalic acid or diphenyl terephthalate.

A suitable aromatic diamine of the formula

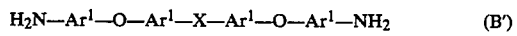  (B')

in which —Ar¹— and —X— have the abovementioned meaning, is preferably 2,2-bis-(4'-aminophenoxyphenyl)propane.

Suitable aromatic diamines of the formula

  (C')

which Ar² has the abovementioned meaning, are, for example, 2,4-dichloro-p-phenylenediamine, 5-tert.-butyl-m-phenylenediamine, 3,3'-dimethoxybenzidine, 3,3'-dichlorobenzidine, 4,4'-diaminodiphenyl ether, 4,4'-diaminodiphenyl ketone, 1,4-bis-(4'-aminophenoxy)benzene or 2,7-diamino-3,6-dimethyldibenzothiophene S,S-dioxide, preferably p-phenylenediamine, m-phenylenediamine, 3,3'dimethylbenzidine, 4,4'-diaminodiphenylmethane or 4,4-diaminodiphenyl sulphone.

The condensation is advantageously carried out by a customary low-temperature solution process.

This solution condensation of the aromatic dicarboxylic acid dichloride with the aromatic diamine is carried out in aprotic, polar solvents of the amide type, for example in N,N-dimethylacetamide or, in particular, in N-methyl-2-pyrrolidone (NMP). If necessary, halide salts of the first and/or second group of the Periodic Table can be added to these solvents in a known manner in order to increase the solution capacity or to stabilize the polyether amide solutions. Preferred additives are calcium chloride and/or lithium chloride. However, the aromatic copolyether amides described are distinguished by high solubility in the above solvents of the amide type, and the condensation is thus preferably carried out without additional salt. The starting compounds (A') on the one hand and (B') and (C') on the other hand are generally employed in equimolar amounts. The amount of dicarboxylic acid dichloride is usually selected so that the solution viscosity is maximized, i.e. slightly more or less than 100 mol-% are added, depending on the monomer unit.

The polycondensation temperatures are between 10' and 100° C. particularly good results are achieved at reaction temperatures between 10° and 80° C. The polycondensation reactions are carried out in a manner such that, on completion of the reaction, 2 to 40, preferably 3 to 30, % by weight of polycondensate are present in the solution. For specific applications, the solution can be diluted, if required, with N-methyl-2-pyrrolidone or other amide solvents.

The polycondensation can be terminated in a customary manner, for example by adding monofunctional compounds, such as acetyl chloride, substituted benzoyl chlorides, for example p-chlorobenzoyl chloride, but preferably benzoyl chloride, but the use of monofunctional amines, for example aniline, N,N-dimethyl-p-phenylenediamine or 3-chloroaniline, is just as suitable for limiting the molecular weight.

After termination of the polycondensation, i.e. when the polymer solution has reached the viscosity necessary for further processing, the hydrogen halide produced, which is loosely bound to the amide solvent, is neutralized by adding basic substances. Substances which are suitable for this purpose are, for example, lithium hydroxide, calcium hydroxide, but preferably calcium oxide. The batch is then generally aftertreated for 50 to 120 minutes at 50° to 80° C. in order to obtain the physical values desired for the polymers. In order to produce shaped structures according to the invention, the above-described copolyamide solutions according to the invention are filtered, degassed and processed further in a known manner which is outlined below.

Suitable amounts of additives can also be added to the solutions. Examples are light stabilizers and deoxidants, flameproofing agents, antistatics, dyes, colored pigments or fillers.

The copolyether amides can be isolated by suitable methods, such as, for example, distillation, precipitation or extraction, and then again converted into a suitable extrusion solution using solvents of the amide type, if necessary using the additives described to increase the solution capacity. For example, salt-free solutions of the polymers can be obtained in this way. However, direct processing of the condensation solution is preferred.

In order to isolate the copolyether amide, a precipitant can be added to the solution, and the coagulated product filtered off. Typical precipitants are, for example, water, methanol and aromatic compounds, such as cyclohexane, toluene etc. The isolation is preferably carried out by comminuting the polymer solution in a granulator using an excess of water. The finely comminuted coagulated polymer particles simplify the subsequent washing steps (removal of the salt formed on neutralization) and drying of the product (prevention of inclusions) after filtering off. In addition, subsequent comminution is superfluous since a free-flowing product is produced directly.

Apart from the solution condensation described, which is regarded as an easily accessible process, other customary processes for the preparation of polyamides, such as, for example, melt, solid or interface condensation, can also be used, as mentioned above. Besides the condensation, these processes also optionally include regulation of the molecular weight and purification or washing steps and the addition of suitable additives.

The additives can, in addition, also be added to the isolated copolymer during processing as a thermoplastic.

The aromatic copolyether amides according to the invention are characterized as predominantly amorphous polymers having surprisingly good mechanical properties, in particular good initial modulus, and a high glass transition temperature. The Staudinger index $[\eta]$ is in the range 50 to 1000 cm$^3$/g, preferably 100 to 600 cm$^3$/g. The glass transition temperatures are generally above 200° C., preferably above 220° C. and in particular above 235° C., and the melting points are in the region up to 380° C. The initial modulus of wet-spun and stretched filaments reaches at least 5 N/tex. In the case of unstretched films, it is above 1.5 GPa, preferably above 2.0 GPa. The initial modulus of test sheets is above 3 GPa, preferably above 3.5 GPa.

The processing of the copolyether amides according to the invention is preferably carried out via the melt by customary techniques for processing thermoplastics. Press-molding, extrusion or injection molding gives moldings, filaments, wires or films.

In the case of processing via the melt, auxiliaries, such as lubricants or melt stabilizers, can be added. The introduction of end groups, for example through the above-described addition of monofunctional compounds, is regarded as favorable for achieving a high melt stability. It is also expedient to thoroughly dry the polymers before processing.

In certain cases, the copolymers can also be processed from the solution, preferably from the condensation solution of the low-temperature solution process described. For example, this process offers a simple way of producing filaments and thin films or can also be advantageous for specific applications, such as the production of prepregs (via the impregnation process) or use as wire enamel.

The production of molded articles from the extrusion solution can take place by dry, wet or dry/wet processes and by spraying.

For example, the spinning solution in wet processes is passed through a spinning head with several spinning apertures into a coagulation bath, the solution solidifying to form filaments. In a variant of this process, the so-called dry/wet process, the filaments first pass through an inert medium, preferably air or nitrogen, and only then enter the coagulation bath.

Pulp is produced, for example, by spraying the solutions into a suitable coagulation bath.

For shaping of films by casting processes, the filtered and degassed solution is applied in thin layers onto carrier materials. Suitable carrier materials are inert polymer films, for example made from polyester, metal bands, and, on a laboratory scale, also glass plates. The solutions are preferably processed at temperatures of at least about 10° C. below the boiling point of the solvent used, particularly preferably about 30° C. below the boiling point. If the temperatures are too high, the danger exists of the polymers decomposing, and processing is made more difficult at excessively low temperatures due to the high viscosities. It is favorable, but not necessary, to pre-dry the cast films, preferably to a solvent content of the film of between 5 and 90%. Suitable conditions are temperatures between room temperature and about 10° C. below the boiling point of the solvents used, also combined with strong convection, for example in circulation ovens. Depending on the temperature and convection, times between a few minutes and several days, preferably 2 to 30 minutes, are sufficient. Depending on the carrier material, the films can be detached immediately or during or directly after coagulation. As an alternative to casting processes, the filtered and degassed solutions can also be coagulated directly by means of suitable nozzles. In this case, wet or dry/wet processes can be used; in the former, coagulation is direct, and in the latter, the pre-shaped film first passes through a zone containing a non-coagulating medium, such as for example, air. This zone can be tween 5 and 400 mm, preferably between 10 and 100 nm.

Coagulation baths which can be used are water, mixtures of water and organic solvents, or pure organic solvents, in each case also with added salt if necessary. Suitable added salts are, for example, the abovementioned halide salts of the first and second groups of the Periodic Table. The salt also used as solubilizer for the preparation of the condensation solution is preferred. Calcium chloride is particularly preferred, it being possible to vary the concentration within broad limits. It is desirable for the temperature to be about 10° C. lower than the boiling point of the coagulation bath, preferably between room temperature and 90° C.

The coagulated filaments or films are subsequently washed with water, for example they can be passed over rollers through several consecutive wash baths. The prerequisite for achieving the properties is that the salt is washed out as completely as possible. Aqueous baths are preferred, and the temperatures are then between room temperature and 90° C., preferably up to 70° C. Several baths in series and circulation of the medium (countercurrent) are usually regarded as favorable.

The drying is preferably carried out via rollers or by IR lamps at temperatures between 100° and 400° C., favorably, but not necessarily, with temperature gradients and/or under nitrogen. The higher the temperature, the shorter the drying times. Final temperatures of 200°-300° C. are regarded as particularly favorable for processing, so that short drying times are sufficient.

In the case of films, a conditioning step at temperatures between 200° and 400° C., preferably 200° and 300° C., optionally with application of tension or under a nitrogen atmosphere, is, in addition, regarded as favorable for achieving a high dimensional stability. A separate conditioning step is superfluous in the production of stretched films.

For uniaxial or biaxial (consecutive or simultaneous) stretching, known methods can be used: besides stretching dry moldings over hot surfaces, under IR lamps or other heat sources, it is also possible to stretch moldings having a residual content of solvent and/or salt, also in solvent baths, in the wet state. In the case of the former method, an advantage is the relatively low minimum temperatures necessary in the range 200°-300° C., preferably around 250° C. Here too, stretching can be carried out under nitrogen. Combinations of wet and dry stretching are also possible. The stretching ratios are in the range 0.5 to 10 fold, preferably 2-5 fold (uniaxial).

Only relatively low stretching ratios are sufficient according to the invention for achieving extremely good mechanical properties.

The copolyether amides according to the invention are suitable for the production of a large number of moldings, such as bearing parts, seals, closures, clips, electrical insulators, electrical plugs, housings for electrical parts, body parts in automotive manufacture, pistons, gearwheels, turbine blades, impellers, filament guides, cam shafts, brake linings, clutch disks etc.

Filaments, fibers or pulp made from the copolyether amides according to the invention can be used, for example, as reinforcing materials for rubber, thermoplastics or heat-curing resins, for the production of filter fabrics or as a light insulating material.

Films and paper are suitable as heat-resistant insulation material, and films, in particular, as a substrate for flexible circuit boards and for use in the area of data processing.

A particular application in which, in particular, the high initial modulus is regarded as favorable comprises the use as a thermoplastic high-temperature matrix for composite materials. The copolymers claimed are suitable here both in the form of solutions, where the high solubility allows the preparation of salt-free solutions, and in the form of powders, filaments or films for the production of prepregs or hybrid fabrics.

The copolyether amides according to the invention and the moldings produced therefrom have been tested by the following test methods:

Staudinger Index [η]

The Staudinger index [η] is defined in accordance with equation 1:

$$[\eta] = \lim_{c_2 \to 0} \frac{(\eta/\eta_1) - 1}{c_2} \qquad \text{Eq. 1}$$

where $\eta$ and $\eta_1$ denote the viscosities of the solution and of the solvents respectively and $c_2$ denotes the concentration of the polymer. The measurement was carried out in N-methylpyrrolidone at 25° C.

Viscosity $\eta_o$

The viscosity $\eta_o$ was determined using a rotation viscosimeter (RV 100, Messrs. Haake, Karlsruhe, Federal Republic of Germany); the value given is that of the condensation solution at 90° C. extrapolated to shear gradient zero.

Mechanical Properties

Tear strength (TS), elongation at break (EB), yield stress (YS), elongation at yield stress (EYS) (see Tables 1 to 4), initial modulus (IM) and knot strength were determined using Instron tensile testers at 23° C. and a relative atmospheric humidity of 50%.

Moldings

The mechanical properties of moldings were determined on sheets pressed from powders ($\phi$6 cm, thickness about 1 mm) in accordance with DIN 53 455 using S3A test specimens in accordance with DIN 53 504.

Films

In accordance with DIN 53 455 using test specimen strip width 15 mm, clamped length 50 mm and measurement rate 20 mm/min).

Filaments

In accordance with DIN 53 834, Part 1.

Thermal Properties

The thermal data, such as glass transition temperature, softening point, melting point and decomposition point, were determined by the methods of thermogravimetry (TGA: nitrogen, 3 K/min), differential thermoanalysis (DSC: nitrogen, 10 K/min), thermomechanical analysis (TMA: TA-3000 system with TMA 40 measurement head from Messrs. Mettler, Greifensee, Switzerland; nitrogen, 40 K/min, clamped length 5 mm, alternating load about 0.25 cN/tex) and by torsion pendulum tests (TPT: in accordance with DIN 53 445).

Electrical Properties

All values were determined at 23° C. and a relative atmospheric humidity of 50%, in detail
dielectric constant and loss factor in accordance with DIN 53 483
resistance in accordance with DIN 53 482
dielectric strength in accordance with DIN 53 481 at 50 Hz.

EXAMPLES

The proportions of the dicarboxylic acid component and the sum of the diamine components were in each case calculated as 100 mol-%.

(1) Aromatic copolyether amide made from 100 mol-% of terephthaloyl dichloride (TPC), 75 mol-% of 2,2-bis-(4'-aminophenoxyphenyl)propane (BAP) and 25 mol-% of 4,4'-diaminodiphenylmethane (DADM).

123.16 g of BAP and 19.83 g of DADM were dissolved in 2537 g of N-methylpyrrolidone (NMP) under nitrogen, and 81.21 g of TPC were added at between 15° and 70° C. over the course of about 60 minutes. The viscous and clear solution was stirred for about a further 40 minutes at 70° C., then neutralized using 24.54 g of CaO (96% purity, i.e. in an excess of 5%) and stirred for a further 30 minutes at 70° C.

The solution contained 7.0% of copolyether amide and 1.7% of $CaCl_2$, and the dissolved copolyether amide exhibited a Staudinger index [η] of 327 $cm^3/g$.

The solution was filtered and coagulated and comminuted in a granulator with addition of water. The precipitated copolyether amide was washed several times with water and then with acetone. The free-flowing polymer was dried at 130° C. under reduced pressure (50–80 mbar) under a gentle stream of nitrogen.

With respect to the thermal stability of the copolyether amide, a weight loss was only apparent from 400° C. in the TGA. In the case of the DSC., the glass transition temperature was 253° C., and the shape of the glass step indicated a predominantly amorphous polymer. Correspondingly, there was only a very small effect regarding the melting behavior, and the melting range ended at about 360° C.

(2) A condensation solution corresponding to Example 1 was filtered, degassed and cast to form films. To this end, it was spread on glass plates at 90° C. using a doctor blade. The cast films were subsequently predried at 90° C. for 48 hours, then coagulated in water at 25° C., subsequently irrigated in running water for 20 minutes and in desalinated water for 24 hours, and then dried at 120° C. and 50 mbar for 48 hours under a gentle stream of nitrogen.

The thickness of the films can set between 2 and 100 μm, depending on the coating thickness applied, and the films are very transparent and virtually colorless to slightly yellowish-gold.

The mechanical properties of an unstretched film (30 μm) were a tear strength of 69 MPa, and elongation at break of 90% and an initial modulus of 2.2 GPa.

In the TMA, the films softened at 236° C.

(3) Free-flowing powder prepared and dried corresponding to Example 1 was press-molded using a high-temperature press to form sheets 6 cm in diameter and 1 mm in thickness.

The effect of the pressing temperature on the mechanical properties in the range 300° to 350° C. is shown by Table 1, the pressing in each case being carried out for 5 minutes at 2.5 t.

TABLE 1

| T/°C. | YS MPa | EYS % | TS MPa | EB % |
|---|---|---|---|---|
| 300 | — | — | 51.7 | 4.0 |
| 310 | — | — | 66.4 | 5.7 |
| 320 | — | — | 87.5 | 9.1 |
| 330 | 92.8 | 11.4 | 90.4 | 10.7 |
| 340 | 90.8 | 11.3 | 87.6 | 12.3 |
| 350 | 91.8 | 10.8 | 89.8 | 25.0 |

The initial modulus of a sheet pressed at 330° C. was 3.6 GPa.

In the TPT, a sheet pressed at 330° C. exhibited a glass transition temperature of 243° C., and the shape of the glass step indicated a substantially amorphous polymer. The melting range extended up to 350° C., and the shear modulus of the melting plateau was 3.7 N/mm$^2$.

(4) Aromatic copolyether amide made from 100 mol-% of terephthaloyl dichloride (TPC), 50 mol-% of 2,2-bis-(4'aminophenoxyphenyl)propane (BAP) and 50 mol-% of 4,4'-diaminodiphenylmethane (DADM).

81.21 g of TPC., 82.10 g of BAP and 39.65 g of DADM were condensed in 2255 g of NMP as in Example 1.

The solution contained 7.0% of copolyether amide and 1.9% of CaCl$_2$, and the dissolved copolyether amide exhibited a Staudinger index [η] of 470 cm$^3$/g.

The aftertreatment was likewise carried out as in Example 1.

With respect to the thermal stability of the copolyether amide, a weight loss was only apparent from 405° C. in the TGA. In the DSC, the glass transition temperature was 270° C., and the shape of the glass step indicated a predominantly amorphous polymer.

The condensation solution was processed to films in corresponding manner to Example 2, and the mechanical properties of an unstretched film (25 μm) were a tear strength of 77 Mpa, an elongation at break of 106% and an initial modulus of 1.7 GPa. In the TMA, the films softened at 248° C.

In corresponding manner to Examples 1 and 3, it was possible to press-mold the free-flowing powder at 380° C. to form transparent and very tough sheets.

Comparison 1

Aromatic copolyether amide made from 100 mol-% of terephthaloyl dichloride (TPC), 25 mol-% of 2,2-bis-(4'-aminophenoxyphenyl)propane (BAP) and 75 mol-% of 4,4'-diaminodiphenylmethane (DADM).

81.21 g of TPC, 41.05 g of BAP and 59.48 g of DADM were condensed in 1974 g of NMP as in Example 1.

The solution contained 7.0% of copolyether amide and 2.1% of CaCl$_2$, and the dissolved copolyether amide exhibited a Staudinger index [η] of 626 cm$^3$/g.

The aftertreatment was likewise carried out as in Example 1.

With respect to the thermal stability of the copolyether amide, a weight loss was only apparent from 410° C. in the TGA.

The condensation solution was processed to films in corresponding manner to Example 2, and the mechanical properties of an unstretched film (35 μm) were a tear strength of 73 MPa, an elongation at break of 115% and an initial modulus of 1.4 GPa. In the TMA, the films softened at 265° C.

However, it was not possible to press-mold the copolyether amide at 380° C. to form sheets in corresponding manner to Example 3.

(5) Aromatic copolyether amide made from 100 mol-% of terephthaloyl dichloride (TPC), 87.5 mol-% of 2,2-bis(4'-aminophenoxyphenyl)propane (BAP) and 12.5 mol-% of p-phenylenediamine (PPD).

81.21 g of TPC, 143.68 g of BAP and 5.41 g of PPD were condensed in 3097 g of NMP as in Example 1.

The solution contained 6.0 g of copolyether amide and 1.4% of CaCl$_2$, and the dissolved copolyether amide exhibited a Staudinger index [η] of 276 cm$^3$/g, and the condensation solution exhibited a viscosity η$_o$ of 18.2 Pa.s at 90° C.

The aftertreatment was likewise carried out as in Example 1.

The condensation solution was processed to films in corresponding manner to Example 2, and the mechanical properties of an unstretched film (30 μm) were a tear strength of 88 MPa, an elongation at break of 107% and an initial modulus of 2.1 GPa. In the TMA, the films softened at 235° C.

(6) Aromatic copolyether amide made from 100 mol-% of terephthaloyl dichloride (TPC), 75 mol-% of 2,2-bis-(4'-aminophenoxyphenyl)propane (BAP) and 25 mol-% of phenylenediamine (PPD).

81.21 g of TPC, 123.16 g of BAP and 10.81 g of PPD were condensed in 2861 g of NMP as in Example 1 and aftertreated.

The solution contained 6.0% of copolyether amide and 1.5% of CaCl$_2$, and the dissolved copolyether amide exhibited a Staudinger index [η] of 555 cm$^3$/g.

The condensation solution was processed to films in corresponding manner to Example 2, and the mechanical properties of an unstretched film (15 μm) were a tear strength of 89 Mpa, an elongation at break of 107% and an initial modulus of 2.3 GPa. In the TMA, the films softened at 240° C.

In corresponding manner to Example 3, it was possible to press-mold the free-flowing powder at 350° C. to form transparent and very tough sheets, and the mechanical properties were a tear strength of 95 MPa and an elongation at break of 10%.

With respect to the thermal stability of the copolyether amide, a weight loss was only apparent from 410° C. in the TGA. In the DSC, the glass transition temperature was 262° C., and the shape of the glass step indicated a predominantly amorphous polymer.

(7) Aromatic copolyether amide made from 100 mol-% of terephthaloyl dichloride (TPC), 50 mol-% of 2,2-bis-(4'-aminophenoxyphenyl)propane (BAP) and 50 mol-% of p-phenylenediamine (PPD).

81.21 g of TPC, 82.10 g of BAP and 21.63 g of PPD were condensed in 1738 g of NMP and aftertreated as in Example 1.

The solution contained 8.0% of copolyether amide and 2.4% of $CaCl_2$, the dissolved copolyether amide exhibited a Staudinger index $[\eta]$ of 726 cm$^3$/g, and the condensation solution exhibited a viscosity $\eta_o$ of 40.8 Pa.s at 90° C.

With respect to the thermal stability of the copolyether amide, a weight loss was only apparent from 460° C. in the TGA. In the DSC., the glass transition temperature was 280° C., and the shape of the glass step indicated a predominantly amorphous polymer.

(8) A condensation solution prepared in accordance with Example 7 was processed to films in corresponding manner to Example 2. The mechanical properties of an unstretched film (11 μm) were a tear strength of 81 MPa, an elongation at break of 33% and an initial modulus of 2.5 GPa.

In the TMA, the films softened at 260° C.

The electrical properties of the films were $3.8 \times 10^{14}$ Ω for the surface resistance, $1.6 \times 10$ Ω.cm for the volume resistance, 4.6 for the dielectric constant, $2.8 \times 10^{-2}$ for the loss factor, and a dielectric strength of 297 kV/mm.

(9) A condensation solution according to Example 7 was filtered, degassed and spun in wet form. To this end, it was spun at 80° C. and a rate of 16 m/min from a nozzle having 50 apertures each of diameter 100 μm into a coagulation bath comprising a solution, at 60° C., of 35% of NMP in water. The 50-filament yarns obtained were drawn through several wash baths, a washer (about 20 wraps), over two drying godets (160° and 180° C.), and finally at 390° C. over a hot surface. The draw ratio here was 1:2.5.

The mechanical properties of the 50-filament yarn of linear density 100 dtex in the untwisted state were a tear strength of 33 cN/tex, an elongation at break of 3.8% and an initial modulus of 10 N/tex.

(10) Aromatic copolyether amide made from 100 mol-% of terephthaloyl dichloride (TPC), 75 mol-% of 2,2-bis-(4'-aminophenoxyphenyl)propane (BAP) and 25 mol-% of 2,7-diamino-3,6-dimethyldibenzothiophene S,S-dioxide (TS).

81.21 g of TPC, 123.16 g of BAP and 27.43 g of TS were condensed in 2638 g of NMP and aftertreated as in Example 1.

The solution contained 7.0% of copolyether amide, 1.6% of $CaCl_2$, and the dissolved copolyether amide exhibited a Staudinger index $[\eta]$ of 274 cm$^3$/g.

The glass transition temperature is 249° C., and the shape of the glass step indicates a predominantly amorphous polymer.

In corresponding manner to Example 3, the effect of the pressing temperature on the mechanical properties was investigated in the range 300°–370° C., cf. Table 2.

TABLE 2

| T (°C.) | TS (MPa) | EB (%) |
|---|---|---|
| 300 | 47.8 | 3.3 |
| 310 | 80.0 | 5.0 |
| 330 | 82.4 | 5.4 |

TABLE 2-continued

| T (°C.) | TS (MPa) | EB (%) |
|---|---|---|
| 340 | 80.2 | 5.2 |
| 350 | 76.7 | 5.6 |
| 370 | 95.2 | 7.7 |

The initial modulus of a sheet pressed at 340° C. was 5.3 GPa.

In the TPT, a sheet pressed at 340° C. exhibited a glass transition temperature at 245° C., and the shape of the glass step indicated a substantially amorphous polymer. The shear modulus of the melting plateau extending up to 390° C. was 5.5 N/mm$^2$.

(11) Aromatic copolyether amide made from 100 mol-% of terephthaloyl dichloride (TPC), 87.5 mol-% of 2,2-bis-(4'-aminophenoxyphenyl)propane (BAP) and 12.5 mol-% of 1,4-bis-(4'-aminophenoxy)benzene (BAPOB).

81.21 g of TPC, 143.68 g of BAP and 14.62 g of BAPOB were condensed in 2741 g of NMP and aftertreated as in Example 1.

The solution contained 7.0% of copolyether amide and 1.5% of $CaCl_2$, and the dissolved copolyether amide exhibited a Staudinger index $[\eta]$ of 239 cm$^3$/g.

With respect to the thermal stability of the copolyether amide, a weight loss was only apparent from 400° C. in the TGA. In the DSC, the glass transition temperature was 246° C., and the shape of the glass step indicated a predominantly amorphous polymer.

In corresponding manner to Example 3, the effect of the pressing temperature on the mechanical properties was investigated in the range 300°–350° C., cf. Table 3.

TABLE 3

| T (°C.) | YS (MPa) | EYS (%) | TS (MPa) | EB (%) |
|---|---|---|---|---|
| 300 | — | — | 80.3 | 6.0 |
| 310 | — | — | 72.3 | 5.3 |
| 340 | — | — | 81.7 | 6.7 |
| 350 | 91.6 | 9.9 | 86.6 | 9.8 |

The initial modulus of a sheet pressed at 350° C. was 4.8 GPa.

(12) Aromatic copolyether amide made from 100 mol-% of terephthaloyl dichloride (TPC), 75 mol-% of 2,2-bis-(4'-aminophenoxyphenyl)propane (BAP) and 25 mol-% of 1,4-bis(4'-aminophenoxy)benzene (BAPOB).

81.21 g of TPC, 123.16 g of BAP and 29.23 g of BAPOB were condensed in 2662 g of NMP and aftertreated as in Example 1.

The solution contained 7.0% of copolyether amide and 1.6% of $CaCl_2$, the dissolved copolyether amide exhibited a Staudinger index $[\eta]$ of 577 cm$^3$/9, and the condensation solution exhibited a viscosity $\eta_o$ of 10.7 Pa.s at 90° C.

With respect to the thermal stability of the copolyether amide, a weight loss was only apparent from 390° C. in the TGA. In the DSC, the glass transition temperature was 253° C., and the shape of the glass step indicated a predominantly amorphous polymer.

The condensation solution from Example 12 was processed to films in corresponding manner to Example 2, and the mechanical properties of an unstretched film (20 μm) were a tear strength of 78 MPa, an elongation at break of 95% and an initial modulus of 2.3 GPa.

In the TMA, the films softened at 235° C.

(14) In corresponding manner to Example 3, sheets were produced from the copolyether amide corresponding to Example 12, and the effect of the pressing temperature on the mechanical properties was investigated in the range 330°–350° C., cf. Table 4.

TABLE 4

| T (°C.) | YS (MPa) | EYS (%) | TS (MPa) | EB (%) |
|---|---|---|---|---|
| 330 | — | — | 89.0 | 7.4 |
| 340 | 98.4 | 11.0 | 93.3 | 10.7 |
| 350 | 98.2 | 10.2 | 98.1 | 14.3 |

The initial modulus of a sheet pressed at 350° C. was 4.5 GPa.

(15) Aromatic copolyether amide made from 100 mol-% of terephthaloyl dichloride (TPC), 50 mol-% of 2,2-bis-(4'-aminophenoxyphenyl)propane (BAP) and 50 mol-% of 1,4-bis-(4'-aminophenoxy)benzene (BAPOB).

81.21 g of TPC, 82.10 g of BAP and 58.47 g of BAPOB were condensed in 2505 g of NMP and aftertreated as in Example 1.

The solution contained 7.0% of copolyether amide and 1.7% of CaCl$_2$, and the dissolved copolyether amide exhibited a Staudinger index [$\eta$] of 584 cm$^2$/g.

With respect to the thermal stability of the copolyether amide, a weight loss was only apparent from 400° C. in the TGA. In the DSC, the glass transition temperature was 265° C., and the glass step indicated a predominantly amorphous polymer.

The condensation solution was processed to films in corresponding manner to Example 2, and the mechanical properties of an unstretched film (30 $\mu$m) were a tear strength of 92 Mpa, an elongation at break of 151% and an initial modulus of 2.3 GPa.

In the TMA, the films softened at 240° C.

In corresponding manner to Example 3, it was possible to press-mold the free-flowing powder at 370° C. to form transparent and very tough sheets.

Comparison 2

Aromatic copolyether amide made from 100 mol-% of terephthaloyl dichloride (TPC), 25 mol-% of 2,2-bis-(4'-aminophenoxyphenyl)propane (BAP) and 75 mol-% of 1,4-bis-(4'-aminophenoxy)benzene (BAPOB).

81.21 g of TPC, 41.05 g of BAP and 87.70 g of BAPOB were condensed in 2348 g of NMP and aftertreated as in Example 1.

The solution contained 7.0% of copolyether amide and 1.8% of CaCl$_2$, and the dissolved copolyether amide exhibited a Staudinger index [$\eta$] of 459 cm$^3$/g.

With respect to the thermal stability of the copolyether amide, a weight loss was only apparent from 410° C. in the TGA.

However, it was not possible to press-mold the copolyether amide at 380° C. to form sheets in corresponding manner to Example 3.

(16) Aromatic copolyether amide made from 100 mol-% of terephthaloyl dichloride (TPC), 75 mol-% of 2,2-bis-(4'aminophenoxyphenyl)propane (BAP) and 25 mol-% of 4,4'-diaminodiphenyl sulfone (DADS).

81.21 g of TPC, 123.16 g of BAP and 24.83 g of DADS were condensed in 2604 g of NMP and aftertreated as in Example 1.

The solution contained 7.0% of copolyether amide and 1.6% of CaCl$_2$, and the dissolved copolyether amide exhibited a Staudinger index [$\eta$] of 157 cm$^3$/g.

With respect to the thermal stability of the copolyether amide, a weight loss was only apparent from 400° C. in the TGA. In the DSC, the glass transition temperature was 268° C., and the glass step indicated a predominantly amorphous polymer.

In corresponding manner to Example 3, it was possible to press-mold the free-flowing powder in the temperature range 240° to 360° C. to form transparent and very tough sheets. The mechanical properties of a sheet pressed at 300° C. were a tear strength of 70 MPa and an elongation at break of 10%.

(17) Aromatic copolyether amide made from 100 mol-% of terephthaloyl dichloride (TPC), 50 mol-% of 2,2-bis-(4'aminophenoxyphenyl)propane (BAP) and 50 mol-% of 4,4-diaminodiphenyl sulfone (DADS).

81.21 g of TPC, 82.10 g of BAP and 49.66 g of DADS were condensed in 2388 g of NMP and aftertreated as in Example The solution contained 7.0% of copolyether amide and 1.8% of CaCl$_2$, and the dissolved copolyether amide exhibited a Staudinger index [$\eta$] of 128 cm$^3$/g.

With respect to the thermal stability of the copolyether amide, a weight loss was only apparent from 410° C. in the TGA. In the DSC, the glass transition temperature was 296° C., and the glass step indicated a predominantly amorphous polymer.

In corresponding manner to Example 3, it was possible to press-mold the free-flowing powder in the temperature range 290°–360° C. to form transparent and very tough sheets. The mechanical properties of a sheet pressed at 330° C. were a tear strength of 89 Mpa and an elongation at break of 10%.

(18) The condensation solution from Example 17 was processed to films in corresponding manner to Example 2, and the mechanical properties of an unstretched film (25 $\mu$m) were a tear strength of 65 Mpa, an elongation at break of 55% and an initial modulus of 1.8 GPa.

In the TMA, the films softened at 278° C.

(19) Aromatic copolyether amide made from 100 mol-% of terephthaloyl dichloride (TPC), 25 mol-% of 2,2-bis-(4'-aminophenoxyphenyl)propane (BAP) and 75 mol-% of 4,4'-diaminodiphenyl sulfone (DADS).

81.21 g of TPC, 41.05 g of BAP and 74.49 g of DADS were condensed in 2172.9 9 of NMP and aftertreated as in Example 1.

The solution contained 7.0% of copolyether amide and 2.0% of CaCl$_2$, and the dissolved copolyether amide exhibited a Staudinger index [$\eta$] of 197 cm$^3$/g.

With respect to the thermal stability of the copolyether amide, a weight loss was only apparent from 410° C. in the TGA. In the DSC, the glass transition temperature was 333° C., and the glass step indicated a predominantly amorphous polymer.

In corresponding manner to Example 3, it was possible to press-mold the free-flowing powder in the temperature range 350°–370° C. to form transparent and very tough sheets.

(20) The condensation solution from Example 19 was processed to films in corresponding manner to Example 2, and the mechanical properties of an unstretched film (20 $\mu$m) were a tear strength of 70 MPa, an elongation at break of 68% and an initial modulus of 1.8 GPa.

In the TMA, the films softened at 314° C.

(21 to 25) Aromatic copolyether amide corresponding to the composition from Table 5. The components terephthaloyl dichloride (TPC), 2,2-bis-(4'-aminophenoxyphenyl)propane (BAP), m-phenylenediamine (MPD) and 3,3'-dimethylbenzidine (OTD) were used here, and the solvent was N-methylpyrrolidone (NMP).

The condensation was carried out as in Example 1, as was the aftertreatment.

The characterization of the solutions with respect to concentration of copolyether amide and CaCl$_2$, Staudinger index [η] of the dissolved copolyether amide, and the viscosity η$_o$ of the condensation solution at 90° C. is likewise collated in Table 5.

The condensation solutions were processed to films in corresponding manner to Example 2, and the mechanical properties of unstretched films and the softening points T$_s$ corresponding to a TMA measurement are likewise collated in Table 5.

It was possible to press-mold all the copolyether amides, starting from free-flowing powders in a temperature range 330°–350° C. in corresponding manner to Example 3 to form transparent and very tough sheets.

(A) and of the sum of units (B) and (C) is each 100 mol-%, the proportion of units (C) being up to 50 mol-% and, when Z represents —SO$_2$—, up to 75 mol-%, and the Staudinger index of the copolyether amide is in the range from 50 to 1000 cm$^3$/g and the glass transition temperature is above 200° C.

2. The copolyether amide as claimed in claim 1, wherein the Staudinger index is in the range from 100 to 600 cm$^3$/g.

3. The copolyether amide as claimed in claim 1, wherein the radicals R and Ar$^1$ are substituted by up to 2 alkyl or alkoxy radicals having 1–4 carbon atoms in the alkyl radical or wherein the radical Ar$^1$ is substituted by halogen.

4. The copolyether amide as claimed in claim 3, wherein the halogen is chlorine or bromine.

TABLE 5

| | Components | | | | | | | | | Characterization | | | | |
|---|---|---|---|---|---|---|---|---|---|---|---|---|---|---|
| | A' | | | B' | | | C' | | | Concentration/% | | | | |
| Ex. | Name | Mol % | g | Name | Mol % | g | Name | Mol % | g | Polymer | CaCl$_2$ | [η] cm$^3$/g | η$_o$ | Pa·s |
| 21 | TPC | 100 | 81.21 | BAP | 87.5 | 143.68 | OTD | 12.5 | 10.61 | 7.0 | 1.6 | 228 | | 10.5 |
| 22 | TPC | 100 | 81.21 | BAP | 75 | 123.16 | OTD | 25 | 21.23 | 7.0 | 1.7 | 280 | | 20.0 |
| 23 | TPC | 100 | 81.21 | BAP | 50 | 82.10 | OTD | 50 | 42.46 | 7.0 | 1.9 | 410 | | 122 |
| 24 | TPC | 100 | 81.21 | BAP | 87.5 | 143.68 | MPD | 12.5 | 5.41 | 7.0 | 1.6 | 236 | | 11.2 |
| 25 | TPC | 100 | 81.21 | BAP | 75 | 123.16 | MPD | 25 | 10.81 | 7.0 | 1.8 | 267 | | 14.3 |

| | | Film properties | | | |
|---|---|---|---|---|---|
| Ex. | NMP g | Tear strength MPa | Elongation at break % | Initial modulus GPa | T$_s$/°C. |
| 21 | 2688 | 82 | 59 | 2.2 | 239 |
| 22 | 2556 | 117 | 109 | 2.8 | 237 |
| 23 | 2293 | 156 | 62 | 4.0 | 245 |
| 24 | 2619 | 84 | 84 | 2.4 | 237 |
| 25 | 2418 | 110 | 135 | 2.7 | 239 |

We claim:

1. An aromatic copolyether amide which can be processed as a thermoplastic, wherein the structure comprises recurring units of the formulae.

　(A)

　(B)

and

　(C)

in which Ar$^1$ denotes a divalent, unsubstituted or substituted aromatic radical having 6 carbon atoms which is linked in the p-position, X represents a 2,2-propylidene link and Ar$^2$ is identical with Ar$^1$ or Ar$^1$ which is linked in the m-position, or is the —Ar$^1$—Z—Ar$^1$— group in which Z is a direct bond, or Z represents the radical —CH$_2$—, —C(CH$_3$)$_2$—, —CO—, —O—, —CH=CH—, —CO—NH— or —O—AR$^1$—O— or the radical

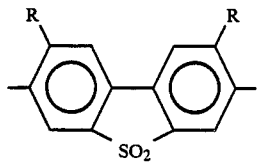

in which R represents hydrogen or a branched or unbranched alkyl radical having 1–4 carbon atoms, Z also represents the radical —SO$_2$—, the proportion of units 5. The copolyether amide as claimed in claim 1, wherein the proportion of units (C) is up to 25 mol-% and, if Z represents —SO$_2$—, up to 50 mol-%.

6. A process for the preparation of a copolyether amide which can be processed as a thermoplastic and contains recurring units of the formulae

　(A)

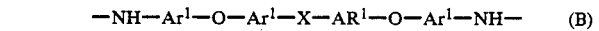　(B)

and

　(C)

in which Ar$^1$ denotes a divalent, unsubstituted or substituted aromatic radical having 6 carbon atoms which is linked in the p-position, X represents a 2,2-propylidene link and Ar$^2$ is identical with Ar$^1$ or Ar$^1$ which is linked in the m-position, or is the —Ar$^1$—Z—Ar$^1$— group in which Z is a direct bond, or Z represents the radical —CH$_2$—, —C(CH$_3$)$_2$—, —CO—, —O—, —CH=CH—, —CO—NH— or —O—Ar$^1$—O— or the radical

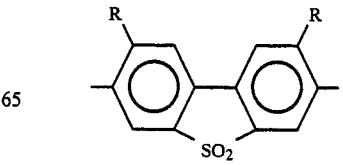

in which R represents hydrogen or a branched or unbranched alkyl radical having 1-4 carbon atoms, Z also represents the radical —SO$_2$— which comprises reacting a compound of the formula $$W-CO-Ar^1-CO-W \quad (A')$$

with a mixture of compounds of the formulae $$NH_2-Ar^1-O-Ar^1-X-Ar^1-O-Ar^1-NH_2 \quad (B')$$
and
$$NH_2-Ar^2-NH_2 \quad (C')$$

in which Ar$^1$, Ar$^2$ and X have the abovementioned meanings, and W represents halogen or a hydroxyl, alkoxy or aryloxy group, by a low-temperature solution, solid, interface or melt condensation process until the copolyether amide has a Staudinger index in the range from 50 to 1000 cm$^3$/g and a glass transition temperature of above 200° C., the proportion of compounds (A') and of the sum of commpounds (B') and (C') each being 100 mol-% and the proportion of (C') being up to 50 mol-% and, when Z represents —SO$_2$—, up to 75 mol-%.

7. The process as claimed in claim 6, wherein the Staudinger index is in the range from 100 to 600 cm$^3$/g.

8. The process as claimed in claim 6, wherein the radicals R and Ar$^1$ are substituted by up to 2 alkyl or alkoxy radicals having 1-4 carbon atoms in the alkyl radical, or wherein the radical Ar$^1$ is substituted by halogen.

9. The process as claimed in claim 8, wherein the halogen is chlorine or bromine.

10. The process as claimed in claim 6, wherein the proportion of compound (C') is up to 25 mol-% and, if Z represents —SO$_2$—, up to 50 mol-%.

11. The process as claimed in claim 6, wherein the compounds (A'), (B') and (C') are reacted in the presence of an aprotic, polar solvent at 10° to 100° C., and is aftertreated at 50° to 80° C.

12. The process as claimed in claim 6,
wherein compound (A') is terephthaloyl dichloride, 2-chloroterephthaloyl dichloride, terephthalic acid or diphenyl terephthalate, wherein compound (B') is 2,2-bis(4'-aminophenoxyphenyl)propane, and wherein compound (C') is 2,4-dichloro-p-phenylenediamine, 5-tert.-butyl-m-phenylenediamine, 3,3'-dimethoxybenzidine, 3,3'-dichlorobenzidine, 4,4'-diaminodiphenyl ether, 4,4'-diaminodiphenyl ketone, 1,4-bis-(4'-aminophenoxy)benzene or 2,7-diamino-3,6-dimethyldibenzothiopheneS,S-dioxide,
p-phenylenediamine, m-phenylenediamine, 3,3'-dimethylbenzidine, 4,4'-diaminodiphenylmethane or 4,4'-diaminodiphenyl sulfone.

13. The process as claimed in claim 6, wherein the reaction is terminated by adding monofunctional compounds as chain terminators.

14. The process as claimed in claim 13, wherein the chain terminator is benzoyl chloride or a monofunktional amine.

15. The process as claimed in claim 6, wherein said low temperature solution process utilizes N,N-dimethylacetamide or N-methyl-pyrrolidone as a solvent.

16. Molding produced from the copolyether amide as claimed in claim 1.

17. The molding claimed in claim 16 in the form of filaments, wires, films or other moldings.

18. The molding as claimed in claim 16, produced by extrusion press-molding or injection-molding of the dry, pulverulent copolyether amide.

19. The molding as claimed in claim 16, produced by processing a solution of the copolyether amide.

20. The molding as claimed in claim 19, wherein the processing is carried out from the condensation solution of the low-temperature solution process, by the impregnation process, by the dry, wet or dry/wet spinning process, by spraying, or by the coagulation or casting process.

* * * * *

UNITED STATES PATENT AND TRADEMARK OFFICE
CERTIFICATE OF CORRECTION

PATENT NO. : 4,966,955

DATED : October 30, 1990

INVENTOR(S) : CHERDRON ET AL

It is certified that error appears in the above-identified patent and that said Letters Patent is hereby corrected as shown below:

At Column 2, line 45 "AR$^1$" should read --Ar$^1$--.

At Column 2, line 54 "A$^1$" should read --Ar$^1$--.

In Claim 1, Column 15, line 40, "formulae." should read --formulae:--.

In Claim 1, Column 15, line 43, "AR$^1$" should read --Ar$^1$--.

In Claim 1, Column 15, line 56, "AR$^1$" should read --Ar$^1$--.

In Claim 1, Column 15, line 56, after "-O-Ar$^1$-O-", please insert --, and Z also represents the radical -SO$_2$-,--.

In Claim 1, Column 15, lines 67-68, please delete "Z also represents the radical -SO$_2$-,".

In Claim 6, Column 16, line 46, "AR$^1$" should read --Ar$^1$--.

In Claim 6, Column 16, line 59, after "-O-Ar$^1$-O-", please insert --, and Z also represents the radical -SO$_2$-,--.

In Claim 6, Column 17, lines 2-3, please delete "Z also represents the radical -SO$_2$-".

UNITED STATES PATENT AND TRADEMARK OFFICE
CERTIFICATE OF CORRECTION

PATENT NO. : 4,966,955
DATED : October 30, 1990
INVENTOR(S) : Cherdron, et al.

It is certified that error appears in the above-identified patent and that said Letters Patent is hereby corrected as shown below:

In Claim 6, Column 17, line 23, "commpounds" should read --compounds--.

Signed and Sealed this

Seventh Day of July, 1992

Attest:

DOUGLAS B. COMER

*Attesting Officer*    *Acting Commissioner of Patents and Trademarks*